A. J. WISNER.
CAR FENDER.
APPLICATION FILED JULY 13, 1910.
1,045,655.
Patented Nov. 26, 1912.
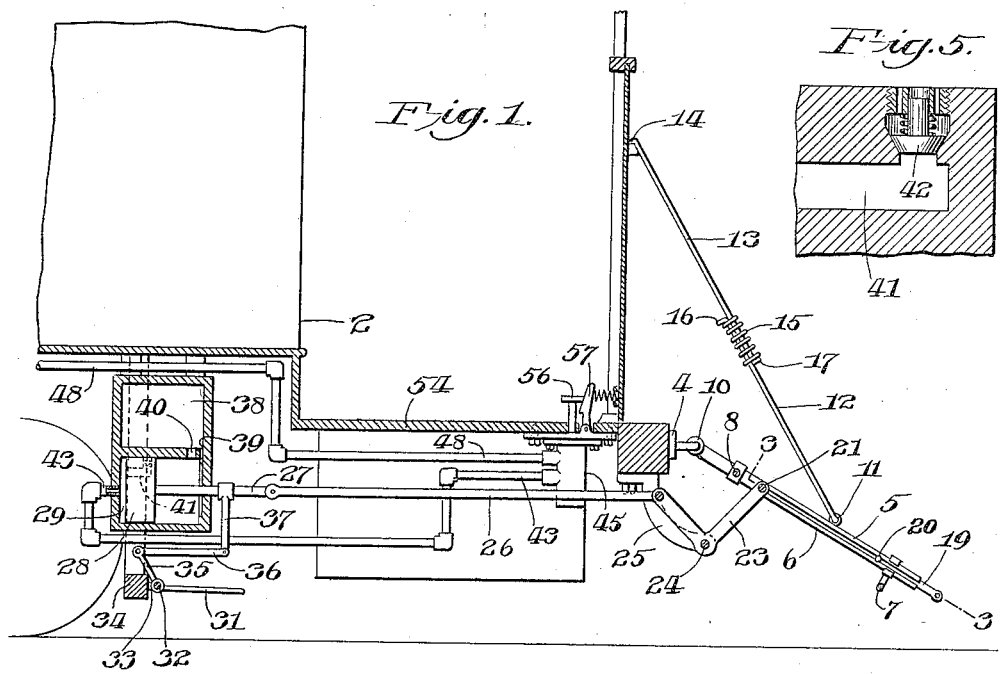
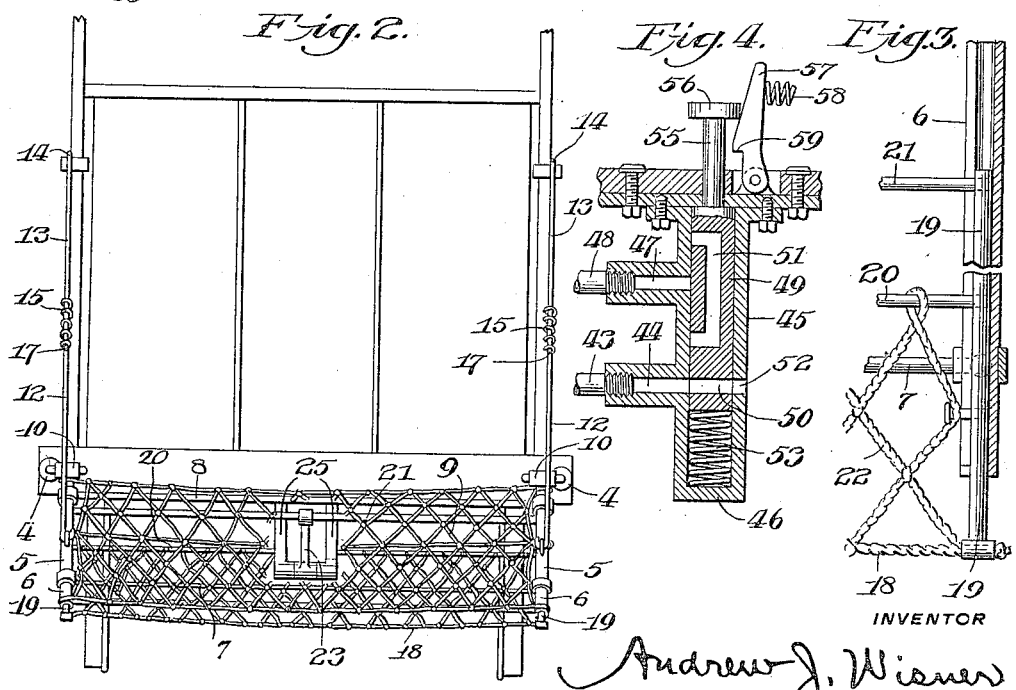
WITNESSES
INVENTOR
Andrew J. Wisner
BY
ATTORNEY

UNITED STATES PATENT OFFICE.

ANDREW J. WISNER, OF PHILADELPHIA, PENNSYLVANIA, ASSIGNOR OF ONE-FOURTH TO GEORGE W. EDMONDS AND ONE-FOURTH TO E. BRYAN KYLE, BOTH OF PHILADELPHIA, PENNSYLVANIA.

CAR-FENDER.

1,045,655.

Specification of Letters Patent. Patented Nov. 26, 1912.

Application filed July 13, 1910. Serial No. 571,675.

*To all whom it may concern:*

Be it known that I, ANDREW J. WISNER, a citizen of the United States, residing at Philadelphia, county of Philadelphia, State of Pennsylvania, have invented certain new and useful Improvements in Car-Fenders, of which the following is a specification.

My invention relates to fenders for railway cars.

The object of the invention is to provide a car with one or more fenders of novel, simple and efficient construction, and a further object of my invention is to provide a novel, simple and efficient means for raising and lowering the fender or fenders.

The invention consists in the novel construction and combinations of parts hereinafter fully described and claimed.

In the drawings: Figure 1 is a longitudinal vertical section showing one end of a railway car and my improved fenders and the operating mechanism therefor. Fig. 2 is a front elevation of the parts shown in Fig. 1. Fig. 3 is a section, on line 3—3 of Fig. 1. Fig. 4 is a vertical section through the foot-operated, air-controlling valve. Fig. 5 is a sectional detail enlarged, showing the air passageway in the piston and the valve controlling the same.

2 designates the car body, which is of usual well known construction. Secured to the two sides of the forward end of the car body 2 are brackets 4 which support a fender 5. The fender 5 comprises tubular side bars 6, transverse bars 7 and 8 connecting the side bars 6 and a rope netting 9. The fender 5 is arranged on an incline, as shown, and the upper and rearward ends of the side bars 6 are pivoted, as at 10, to the bracket 4, whereby the fender 5 may be raised and lowered on the pivot 10. Pivoted to the side bars 6, as at 11, are the lower ends of rods 12, the upper ends of which overlap the lower ends of rods 13, which extend upwardly therefrom and are pivoted as at 14 to the front wall of the car 2. Surrounding the overlapping ends of the rods 12 and 13 are springs 15 the upper ends of which are engaged by projections 16 on the upper ends of the rods 12 and the lower ends of which are engaged by projections 17 on the lower ends of the rods 13. It will thus be seen that the fender 5 may be lowered on the pivot 10 against the action of the springs 15 to bring the forward end of the fender 5 down close to the underlying road bed.

The fender 5 is the main fender of the car, and it is provided with a second or supplemental fender 18 comprising side bars 19, transverse bars 20 and 21 connecting the side bars 19 and a rope netting 22 connected to the side bars 19 and to the bar 20, and arranged beneath the rope netting 9. The side bars 19 are slidingly fitted within the tubular bars 6, the tubular bars 6 being provided with slots in their inner walls through which the bars 20 and 21 extend. It will thus be seen that the fender 18 may be moved relatively to the fender 5 to project the forward end of the fender 18 forwardly of the forward end of the fender 5 and back again to the position shown in the drawings.

The bar 21 of the fender 18 is fitted to the forward arm of a centrally-arranged bell-crank lever 23 which is fulcrumed as at 24 on a bracket 25 secured to the bottom of the car body 2. The rearward arm of the bell-crank lever 23 is pivoted to the forward end of a link or bar 26, the rearward end of which is pivoted to the forward end of a rod 27 projecting from a piston 28 within a horizontally-arranged air cylinder 29, the piston rod 27 extending through and beyond the forward end of the cylinder 29.

The piston 28 rests normally at the rearward end of the cylinder 29; and, from the construction thus far described, it will be seen that if the piston 28 be moved from the rearward end of the cylinder 29 to the forward end thereof, the bell-crank lever 23 will be moved forwardly on its fulcrum 24, thereby lowering the fender 5 on its pivot 10 against the action of the springs 15, and at the same time projecting the forward end of the fender 18 forwardly of the forward end of the fender 5 due to the location of the pivots 10 and 24 relatively to each other and to the path of movement of the end of the bell-crank lever 23 connected to the bar 20.

When the piston 28 reaches the end of its forward stroke, the forward end of the fender 18 is in a position close to the underlying road bed, and the two fenders 5 and 18 form in effect one continuous fender to receive the body of a person or other object in the path of the car. It will also be seen that if the piston be moved back again or from the forward end of the cylinder 29 to the rearward end thereof, the parts will be returned to the positions shown in the drawings.

Located beneath the car body 2 in rear of the fender 5, is a small fender 31, the rearward end of which is pivoted as at 32, to a bracket 33 on a transverse bar 34 suitably secured to the car body 2, the bar 34 being located directly in advance of the carrying wheels for the car. This fender 31 is provided with an upwardly extending arm 35 which is connected by a link 36 to an arm 37 secured to and extending downwardly from the piston rod 27. It will thus be seen that when the piston rod 27 is operated to lower and raise the fenders 5 and 18, the fender 31 will also be lowered to a position close to the road bed and raised again to the position shown in the drawings.

Located adjacent the air cylinder 29 and formed in the casting therewith is an air reservoir 38. The top wall of the cylinder 29 or bottom wall of the reservoir 38 is provided with a port 39 affording communication between the forward end of the cylinder 29 and the reservoir 38; and the top wall of the cylinder 29 is also provided with a port 40 adjacent and rearwardly of the port 39 also affording communication between the cylinder 29 and reservoir 38.

The piston 28 is provided with a passageway 41 therein, one end of which is open at the rearward face of the piston 28 and the other end of which is open at the top of the piston 28 and is normally closed by the top wall of the cylinder 29. This passageway 41 is adapted to register with the port 40 when the piston is in the forward position, and the passageway 41 is provided with a suitable spring pressed valve 42 arranged to permit air to pass from the rearward end of the cylinder 29 into the reservoir 38 when the passageway 41 is in registry with the port 40, and to prevent air from passing from the reservoir 38 through the passageway 41 and into the rearward end of the cylinder 29 for a purpose hereinafter described.

Communicating with the rearward end of the cylinder 29 is one end of an air pipe 43, the other end of which communicates with a port 44 in the cylinder or casing 45 of a foot-operated valve 46. The cylinder 45 of this valve 46 is also provided with a port 47 communicating with a pipe 48 leading from the compressed air reservoir of the car, the compressed air reservoir of the car being the usual and well known reservoir employed to supply compressed air to the brakes. Within the cylinder 45 is a vertically, reciprocative piston 49 which is provided with passageways 50 and 51. When the piston 49 is in the position shown in the drawings, the passageway 50 affords communication between the port 44 and a port 52 leading to the open air, and the body of the piston 49 closes the port 47. The piston 49 is maintained in this normal position by the action of a spring 53 bearing against the bottom of the cylinder 45 and the bottom of the piston 49. When the piston 49 is depressed against the action of the spring 53, the ports 44 and 52 are first closed by the body of the piston 49, and immediately thereafter communication is established between the ports 44 and 47 by the passageway 51, for a purpose hereinafter described. The valve 46 is secured to the platform 54 of the car, and extending upwardly from the piston 49 and above the platform 54 is a rod 55, the upper end of which is provided with a head 56 adapted to be engaged by the foot of the motorman operating the car to depress the piston 49 to bring the passageway 51 into registry with the ports 44 and 47.

In order to hold the piston 49 in the depressed position against the action of the spring 53, I provide a latch 57, which is pressed normally against the head 56 by the action of a spring 58. The latch 57 is provided with a tooth 59, which is adapted to be projected over the head 56 by the spring 58, when the piston 49 is depressed. When it is desired to raise the piston 59, it is merely necessary for the motorman to move the latch 57 forwardly by his foot to disengage the tooth 59 from the head 56 whereupon the spring 53 will raise the piston 49 to the position shown in the drawings.

The piston 29 is operated by air pressure under the control of the valve 46 as follows:—Normally, the parts are in the positions shown in the drawings, and air is supplied to the pipe 48 from the air reservoir (not shown) of the car. When it is desired to lower the fenders, the motorman places his foot upon the head 46 and depresses the piston 49 against the action of the spring 53 until the tooth 59 of the latch 57 engages the head 46, and the passageway 51 comes into registry with the ports 44 and 47 thus supplying air to the rearward end of the cylinder 29. The air thus supplied acts upon the rearward face of the piston 28 and moves it to the forward end of the cylinder 29 thereby lowering the fenders, as previously described, and bringing the passageway 41 into registry with the port 40. In this position of the piston 28, the air within the rearward end of the cylinder 29 is permitted to enter the reservoir 38, and the port 39 is affording communication between the forward end of the cylinder 29 and the forward face of the piston 28. The parts remain in this position until the latch 57 is disengaged from the head 56, and this is done when it is desired to raise the fenders. Immediately upon disengaging the latch 57 from the head 56, the piston 49 is raised by the spring 53 to the position shown in the drawings, thereby closing the port 47 and establishing communication between the rearward end of the cylinder 29 and the open air through the pipe 43, port 44, passageway 50 and port 52, thus permitting the compressed air to pass out of the rearward end of the cylinder 29, and the compressed air in the reservoir 38 to pass through the port 39 into the forward end of the cylinder 29, and return the piston 28 to the position shown in the drawings, thereby raising the fenders, as previously described.

I claim:—

1. The combination of a car, a fender pivoted thereto, a second fender slidably fitted to parts of the first named fender and movable relatively thereto, said second fender having a part extending beneath the first named fender, an air cylinder, a piston within the cylinder, means for introducing air to and exhausting it from the two ends of the cylinder to move the piston back and forth, and means operated by the piston for raising and lowering the second named fender relatively to the first named fender and for raising and lowering the first named fender relatively to the car.

2. The combination of a car, a fender pivoted thereto, a second fender pivoted to the car in rear of the first named fender, an air cylinder, a piston within the cylinder, means for introducing air to and exhausting it from the two ends of the cylinder to move the piston back and forth, a rod extending from said piston, means operated by said rod for raising and lowering the first named fender, and means operated by said rod for raising and lowering the second named fender.

3. The combination of a car, a fender pivoted thereto, a second fender carried by the first named fender and movable relatively thereto, a third fender pivoted to the car in rear of the first named fender, an air cylinder, a piston within the cylinder, means for introducing air to and exhausting it from the two ends of the cylinder to move the piston back and forth, a rod extending from said piston, and a lever operated by said rod and connected to the second named fender, and means operated by said rod for raising and lowering the third named fender.

4. The combination of a car, a fender pivoted thereto, a rod pivoted to the car and extending downwardly toward said fender, a rod pivoted to said fender and extending upwardly therefrom and having its upper end overlapping the first named rod, and a spring encircling the overlapping portions of said rods and having its upper end engaged by the upper end of the second named rod and its lower end engaged by the lower end of the first named rod.

5. The combination of a car, a fender pivoted thereto, a rod pivoted to the car and extending downwardly toward said fender, a rod pivoted to said fender and extending upwardly therefrom and having its upper end overlapping the first named rod, a spring encircling the overlapping portions of said rods and having its upper end engaged by the upper end of the second named rod and its lower end engaged by the lower end of the first named rod, and means for raising and lowering said fender.

6. The combination of a cylinder, a piston within the cylinder, a rod extending from the forward end of the cylinder and through the forward end of the cylinder, an air chamber adjacent the cylinder and communicating with the forward end of the cylinder, a wall forming a passageway affording communication with said chamber and said cylinder adjacent the forward end thereof, said piston having a passageway therein, having one end open at the rearward end of the piston and the other end normally closed by the cylinder and in registry with the first named passageway when the piston is at the forward end of the cylinder, a valve permitting air to leave the cylinder and preventing air from entering the cylinder through the last named passageway when it is in registry with the first named passageway, and means for introducing air to and exhausting it from the rearward end of the cylinder.

In testimony whereof I affix my signature in the presence of two witnesses.

ANDREW J. WISNER.

Witnesses:
F. E. TUNNEY,
S. I. HARPER.

Copies of this patent may be obtained for five cents each, by addressing the "Commissioner of Patents, Washington, D. C."